US008665517B2

(12) United States Patent
Araki

(10) Patent No.: US 8,665,517 B2
(45) Date of Patent: Mar. 4, 2014

(54) MICROSCOPE CONNECTING UNIT AND MICROSCOPE SYSTEM

(75) Inventor: Makoto Araki, Tokyo (JP)

(73) Assignee: Olympus Corporation, Tokyo (JP)

( * ) Notice: Subject to any disclaimer, the term of this patent is extended or adjusted under 35 U.S.C. 154(b) by 550 days.

(21) Appl. No.: 12/909,938

(22) Filed: Oct. 22, 2010

(65) Prior Publication Data

US 2011/0096393 A1    Apr. 28, 2011

(30) Foreign Application Priority Data

Oct. 26, 2009    (JP) .................................. 2009-245280

(51) Int. Cl.
*G02B 21/00* (2006.01)

(52) U.S. Cl.
USPC .......................................... 359/368; 359/434

(58) Field of Classification Search
None
See application file for complete search history.

(56) References Cited

U.S. PATENT DOCUMENTS

| | | | | |
|---|---|---|---|---|
| 4,244,634 | A * | 1/1981 | Dianetti et al. ................ | 359/374 |
| 6,097,538 | A * | 8/2000 | Watanabe et al. ............. | 359/390 |
| 6,631,029 | B2 * | 10/2003 | Kawamura et al. ........... | 359/368 |
| 7,196,339 | B2 | 3/2007 | Namba et al. | |
| 7,262,909 | B2 * | 8/2007 | Bosser et al. .................. | 359/385 |
| 7,598,502 | B2 | 10/2009 | Nishiwaki et al. | |
| 7,639,357 | B2 | 12/2009 | Okugawa | |
| 2001/0008462 | A1 * | 7/2001 | Takeuchi ....................... | 359/385 |
| 2006/0011857 | A1 | 1/2006 | Funk et al. | |
| 2006/0012874 | A1 | 1/2006 | Funk et al. | |
| 2007/0268574 | A1 | 11/2007 | Sasaki | |
| 2008/0239475 | A1 | 10/2008 | Hirukawa et al. | |
| 2009/0046360 | A1 | 2/2009 | Funk et al. | |
| 2009/0073552 | A1 | 3/2009 | Yokoi | |
| 2010/0254000 | A1 | 10/2010 | Huhse et al. | |
| 2011/0116165 | A1 * | 5/2011 | Suzuki .......................... | 359/388 |

FOREIGN PATENT DOCUMENTS

| | | |
|---|---|---|
| DE | 10 2004 011 770 A1 | 10/2005 |
| DE | 10 2007 047 183 A1 | 4/2009 |
| EP | 1 168 029 A2 | 1/2002 |
| EP | 1 617 252 A1 | 1/2006 |
| EP | 1 617 253 A1 | 1/2006 |
| EP | 1 637 871 A1 | 3/2006 |
| EP | 1 857 853 A2 | 11/2007 |
| EP | 2 042 905 A1 | 4/2009 |
| JP | 06-347703 A | 12/1994 |

(Continued)

OTHER PUBLICATIONS

European Search Report dated Feb. 21, 2011 (in English) in counterpart European Application No. 10013894.0.

(Continued)

*Primary Examiner* — Arnel C Lavarias
(74) *Attorney, Agent, or Firm* — Holtz, Holtz, Goodman & Chick

(57) ABSTRACT

Three or more devices can be connected to a microscope and can be used simultaneously. Provided is a microscope connecting unit including a microscope connection port that is connected to a microscope used to observe a sample; three or more unit connection ports to which a stimulating unit that irradiates the sample with light or a confocal observation unit or an image capturing unit that detects light generated at the sample is connectable; and two or more light-path combining units that are disposed between the microscope connecting port and the unit connection ports and that combine light paths optically connecting the microscope with the confocal observation unit, the stimulating unit, and the image capturing unit.

13 Claims, 9 Drawing Sheets

(56) References Cited

FOREIGN PATENT DOCUMENTS

| JP | 2000-028926 | A | 1/2000 |
|---|---|---|---|
| JP | 3069911 | B2 | 5/2000 |
| JP | 2001-159735 | A | 6/2001 |
| JP | 2004-318181 | A | 11/2004 |
| JP | 2005-308985 | A | 11/2005 |
| JP | 2008-164841 | A | 7/2008 |
| JP | 2009-036978 | A | 2/2009 |

OTHER PUBLICATIONS

Extended European Search Report (EESR) dated Jun. 9, 2011 (in English) in counterpart European Application No. 10013894.0.

* cited by examiner

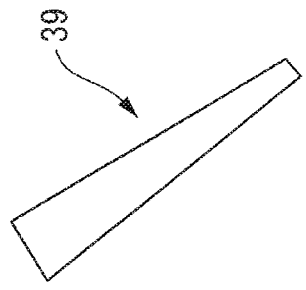
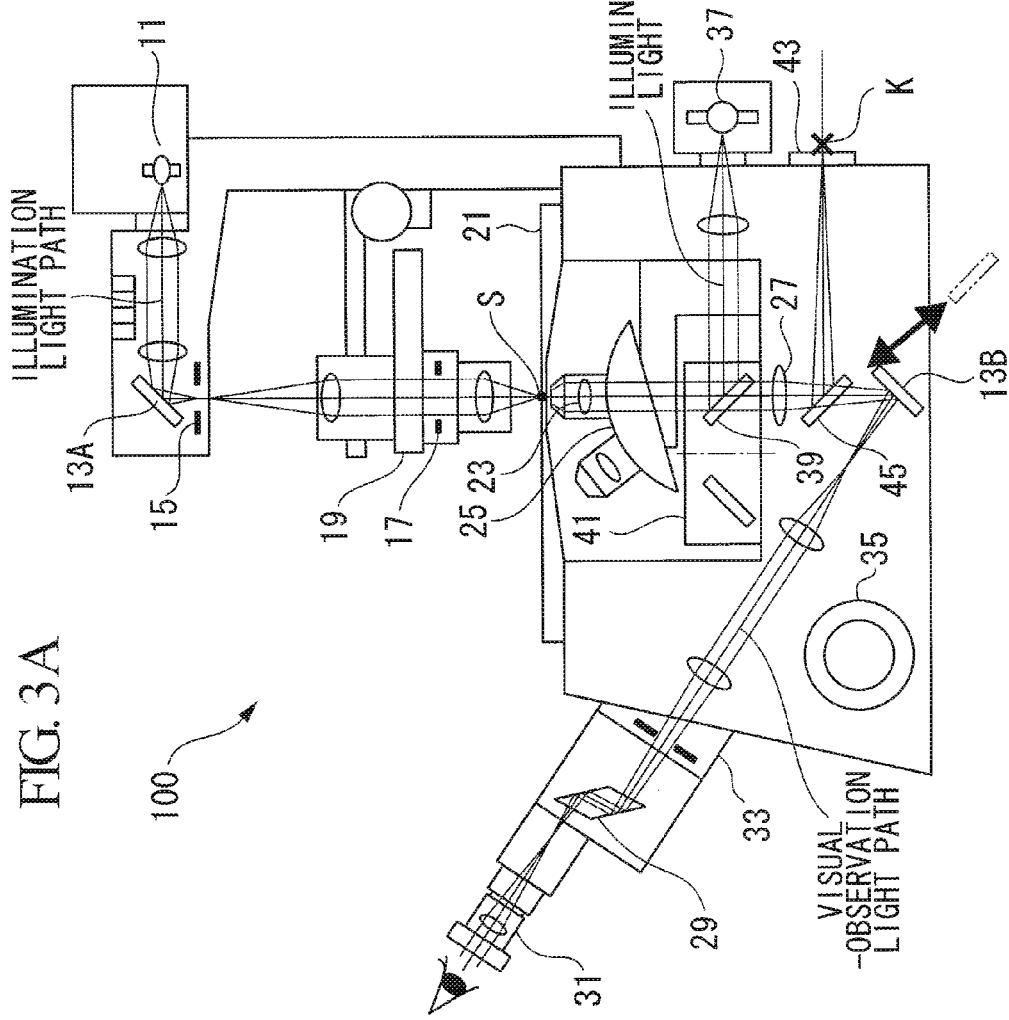

MICROSCOPE CONNECTING UNIT AND MICROSCOPE SYSTEM

BACKGROUND OF THE INVENTION

1. Field of the Invention

The present invention relates to microscope connecting units and microscope systems.

This application is based on Japanese Patent Application No. 2009-245280, the content of which is incorporated herein by reference.

2. Description of Related Art

In a type of conventionally known microscope device, a camera or the like is attached to an eyepiece, making it possible to capture enlarged images of a sample as well as to visually observe the sample via an eyepiece lens (e.g., see the Publication of Japanese Patent No. 3069911 and Japanese Unexamined Patent Application, Publication No. 2004-318181). In the microscope device according to the Publication of Japanese Patent No. 3069911, a light path for images is integrated with a microscope. With a simple optical system, the device as a whole is made compact, and a stage on which a sample is placed is provided at a low position, serving to improve working efficiency from an ergonomic perspective. On the other hand, the microscope device according to Japanese Unexamined Patent Application, Publication No. 2004-318181 includes a prism that branches light transmitted through an objective lens into an observation light path and an image-capturing light path, and it is possible to perform observation and image capturing simultaneously by using two ports for the observation light path and image-capturing light path branched via the prism.

However, with the microscope device according to the Publication of Japanese Patent No. 3069911, it is not possible to use three or more devices simultaneously, such as an observation device, a stimulating device, and an image capturing device for capturing an image showing the response of a sample while observing and stimulating the sample.

On the other hand, with the microscope device according to Japanese Unexamined Patent Application, Publication No. 2004-318181, the focal length of an image forming lens is extended, and branching means is added between the image forming lens and a point where a primary image is formed, making it possible to use three light paths simultaneously. However, when the focal distance of the image forming lens is extended, the focal distances of a relay lens system of the visual-observation light path and a TV camera adapter (picture lens) of the image-capturing light path become relatively large, resulting in an increase in size of the device. Furthermore, interoperability with peripheral devices is lost: for example, the magnification factor of the objective lens changes. Furthermore, when the distance between the objective lens and the image forming lens is extended and branching means is added, the lens diameter inevitably becomes larger. This results in disadvantages such as an increase in size of the device as a whole, a higher position of the stage, or reduced working efficiency.

BRIEF SUMMARY OF THE INVENTION

The present invention has been made in view of the situation described above, and it is an object thereof to provide a microscope connecting unit and a microscope system with which three or more devices can be connected to a microscope and the devices can be used simultaneously.

In order to achieve the above object, the present invention employs the following solutions.

A first aspect of the present invention is a microscope connecting unit including a microscope connector that is connected to a microscope used to observe a sample; three or more connection ports to which an irradiating unit that irradiates the sample with light or a detecting unit that detects light generated at the sample is connectable; and two or more light-path combining units that are disposed between the microscope connector and the connection ports and that combine light paths optically connecting the microscope with the irradiating unit or the detecting unit.

According to this aspect, by using the microscope connector and the connection ports, it is possible to optically connect the microscope with three or more irradiating units or detecting units without increasing the size of the microscope or reducing the working efficiency of the microscope. Furthermore, by combining light paths optically connecting the microscope with the irradiating units or detecting units by means of the light-path combining units, it is possible to use these units simultaneously without switching the light paths between the irradiating units and detecting units. Accordingly, for example, it becomes possible to observe the sample immediately after irradiation with stimulation light without missing its response.

In the first aspect above, the microscope connecting unit may further include a relay optical system that forms the light paths and that relays a primary image of the sample formed by the microscope.

With this configuration, it is possible to reconstruct a primary image of the sample at remote locations via the relay optical system. Accordingly, it is readily possible to place the light-path combining units between the microscope connector and the connection ports and to readily combine a plurality of light paths.

In the first aspect above, the light-path combining units may be disposed in substantially parallel light beams formed by the relay optical system.

With this configuration, since the light-path combining units combine light paths of the substantially parallel light beams, image degradation due to astigmatic difference can be prevented. Astigmatic difference refers to the difference between points at which light is focused with respect to two directions perpendicular to the optical axis.

In the first aspect above, the relay optical system may form non-parallel light beams.

With this configuration, image degradation due to interference fringes caused by the effect of light reflection at the back faces of the light-path combining units can be prevented.

In the first aspect above, the connection ports may have substantially the same shape.

With this configuration, irradiating units and detecting units can be combined freely in accordance with the number of connection ports. Accordingly, it is possible to increase the ability to change the observation method.

In the first aspect above, the microscope connecting unit may further include a switching unit that can switch the light-path combining units on the light path.

With this configuration, simply by switching the light-path combining units by the switching unit, it is possible to combine or separate light paths between the microscope and the irradiating units or detecting units. The switching of the light-path combining units by the switching unit may be performed either automatically or manually.

In this configuration, at least one of the light-path combining units may be mountable on and removable from the switching unit.

In the first aspect above, the light-path combining units may be each implemented by a plurality of beam splitters; the plurality of beam splitters are mountable on and removable from the switching unit.

With this configuration, it is possible to place an optimal one of the plurality of beam splitters in the light path in accordance with the switching of the observation method by the irradiating units or the detecting units.

A second aspect of the present invention is a microscope system including a microscope connecting unit according to the first aspect above, the microscope, the irradiating unit and/or the detecting unit, and a control device that controls these units.

According to this aspect, with the control device, it is possible to quickly and accurately achieve synchronization between the microscope connecting unit and the irradiating unit or the detecting unit.

In the second aspect above, the microscope system may further include a storage unit that stores reference information regarding points of irradiation of the sample by the irradiating unit and points of light detection by the detecting unit; and a correcting unit that corrects displacement of the points of irradiation by the irradiating unit and displacement of the points of detection by the detecting unit, based on the reference information stored in the storage unit.

With this configuration, even when the light-path combining units are switched by the switching unit in accordance with the observation method, displacement of the points of irradiation by the irradiating unit or displacement of the points of detection by the detecting unit can be prevented by the operation of the storage unit and the correcting unit.

In the second aspect above, the detecting unit may include a unit connector that is connected to one of the connection ports; an observation light source that generates observation excitation light for irradiating the sample; an observation scanning unit that two-dimensionally scans the observation excitation light emitted from the observation light source over the sample; a confocal pinhole that partially passes observation light emitted from the sample irradiated with the observation excitation light and returning via the observation scanning unit; and a detection optical system that detects the observation light having passed through the confocal pinhole.

With this configuration, the observation excitation light emitted from the observation light source and scanned by the observation scanning unit irradiates the sample via the unit connector. Furthermore, the observation light generated at the sample and passed through the confocal pinhole via the observation scanning unit is detected by the detecting unit. Accordingly, it is possible to perform confocal observation of the sample.

In the second aspect above, the irradiating unit may include a unit connector that is connected to one of the connection ports; a stimulation light source that generates stimulation light for irradiating the sample; and a stimulation scanning unit that two-dimensionally scans the stimulation light emitted from the stimulation light source over the sample.

With this configuration, the stimulation light emitted from the stimulation light source and scanned by the stimulation scanning unit irradiates the sample via the unit connector. Accordingly, it is possible to stimulate a desired point of the sample with light.

In the second aspect above, the detecting unit may include a two-dimensional image capturing device that is connectable to and disconnectable from the connection ports.

Since the two-dimensional image capturing device detects light on a plane, the frame rate is higher compared with the case where confocal observation is performed. Thus, with the two-dimensional image capturing device, for example, it is possible to capture the quick response of a calcium ion or the like.

In the second aspect above, the detecting unit may include a multipoint scanning unit that scans the light concurrently at multiple points and an irradiating unit that irradiates the sample with illuminating light.

The detecting unit may employ multipoint laser scanning with a digital micromirror device (DMD) (microdeflector array), disk confocal techniques, or the like. These techniques provide higher frame rates compared with galvanometric scanners or resonant scanners, so that it is possible to observe a sample without missing its quick response.

According to the present invention, an advantage is afforded in that three or more devices can be connected to a microscope and the devices can be used simultaneously.

BRIEF DESCRIPTION OF THE SEVERAL
VIEWS OF THE DRAWINGS

FIG. 3A is an illustration schematically showing the configuration of a microscope in FIG. 1;

FIG. 3B is an illustration showing the shape of a beam splitter;

DETAILED DESCRIPTION OF THE INVENTION

First Embodiment

Now, a microscope connecting unit and a microscope system according to a first embodiment of the present invention will be described with reference to the drawings.

Figure 1:
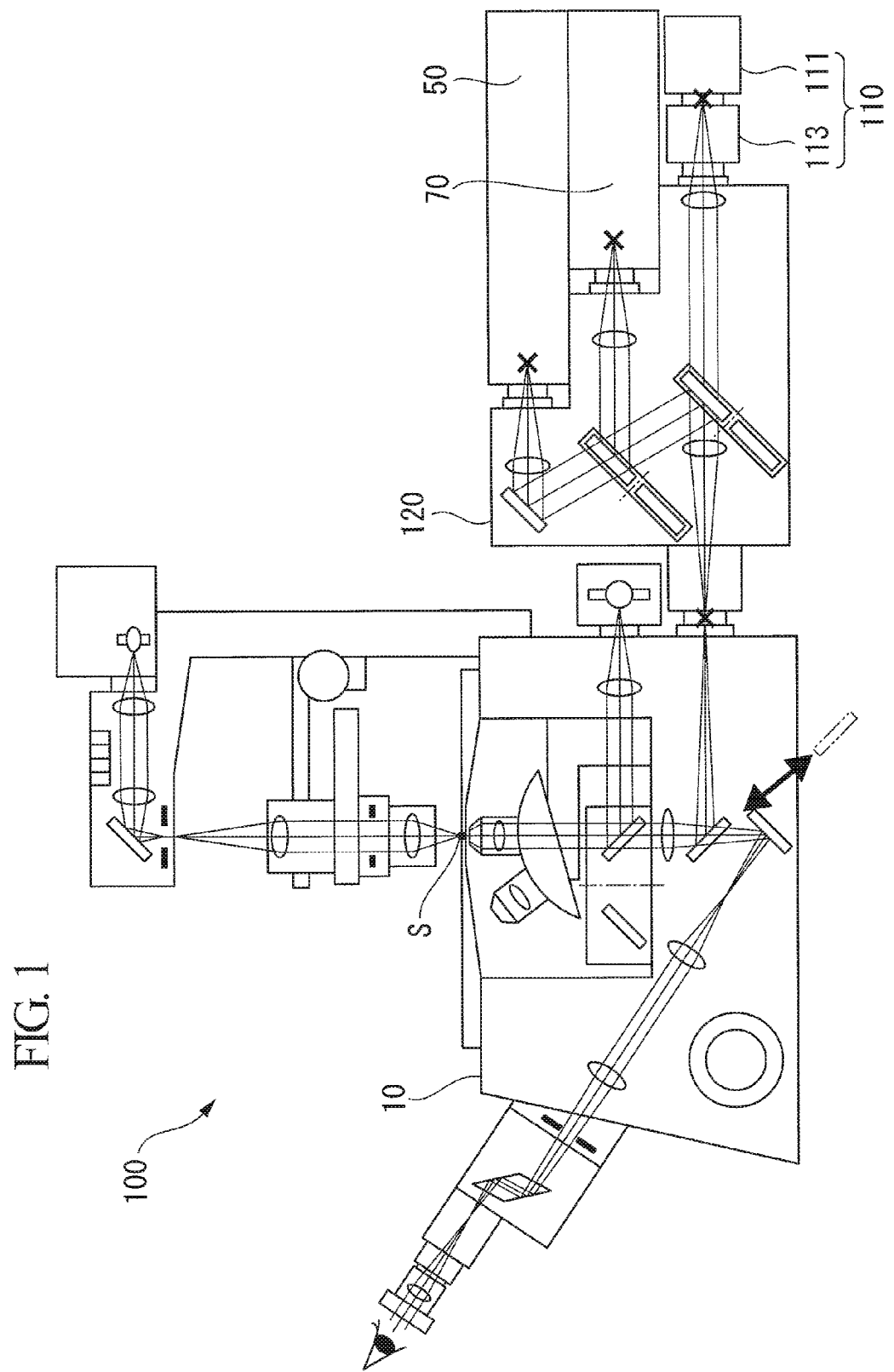
FIG. 1 is an illustration schematically showing the configuration of a microscope system according to a first embodiment of the present invention.
Figure 2:
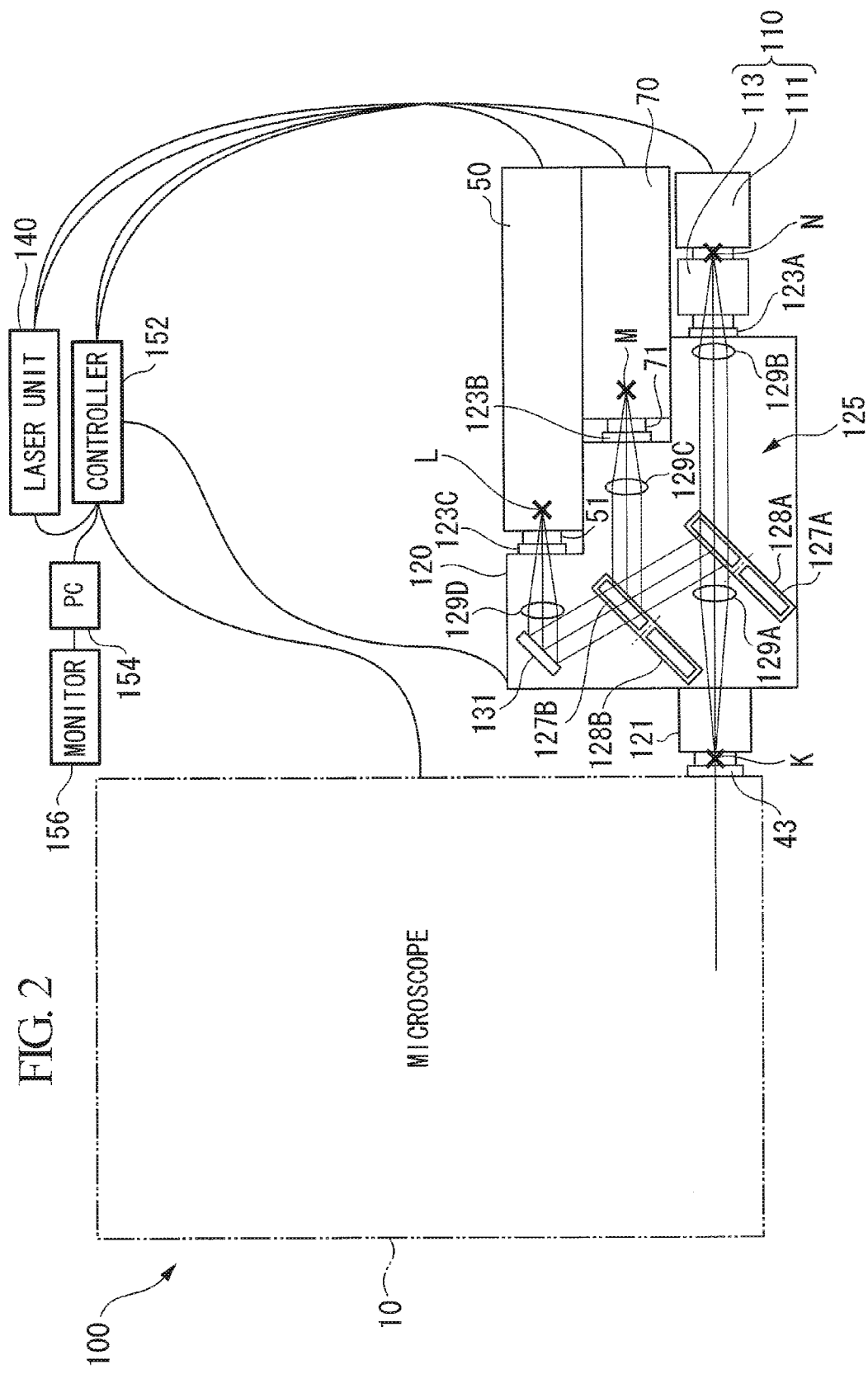
FIG. 2 is an illustration schematically showing the configuration of a microscope connecting unit in FIG. 1.

As shown in FIGS. 1 and 2, a microscope system 100 according to this embodiment includes a microscope 10 for visually observing a sample S, a laser unit (observation light source and stimulation light source) 140 that generates laser beams (observation excitation light and stimulation light), a confocal observation unit (detecting unit) 50 for performing confocal observation of the sample S, a stimulating unit (irradiating unit) 70 for stimulating the sample S with light, an image capturing unit (detecting unit) 110 for acquiring a two-dimensional image of the sample S, and a microscope connecting unit 120 for optically connecting the microscope 10 to the confocal observation unit 50, the stimulating unit 70, and the image capturing unit 110.

Furthermore, the microscope system 100 includes a controller (control device) 152 that controls the system as a whole, a computer 154 that performs information processing, storage, image construction, etc., and a monitor 156 that displays information or images processed by the computer 154.

With the controller 152 controlling the system as a whole, it is possible to achieve synchronization quickly and accurately among the confocal observation unit 50, the stimulating unit 70, and the image capturing unit 110.

The controller 152 and the computer 154 can be operated via a GUI (not shown). Thus, operation is simple and operation errors can be prevented.

As shown in FIG. 3A, the microscope 10 includes a halogen lamp 11 that emits illuminating light for transmission observation, a condenser 19 that condenses the illuminating light emitted from the halogen lamp 11 and reflected by a microscope first reflecting mirror 13A onto the sample S on a stage 21 via a field stop (FS) 15 and an aperture stop (AS) 17, and a plurality of objective lenses 23 that focus light that has been transmitted through the sample S as a result of irradiating the sample S with the illuminating light condensed by the condenser 19. The objective lenses 23 are supported by a revolver 25.

Furthermore, the microscope 10 includes an image forming lens 27 that forms an image by using light coming through the objective lens 23 and an eyepiece lens 31 for visually observing an image formed via the image forming lens 27 and split by a prism 29 via a microscope second reflecting mirror 13B. Reference sign 33 denotes a microscope shutter, and reference sign 35 denotes a focus knob for performing focusing.

Furthermore, the microscope 10 includes a mercury lamp 37 that emits illuminating light for observation with epi-illumination and a beam splitter 39 that reflects the illuminating light emitted from the mercury lamp 37 toward the objective lens 23 to irradiate the sample S while transmitting observation light from the sample S so that the observation light enters the image forming lens 27.

The beam splitter 39 is provided in a cube turret 41 for switching the microscopy method. Furthermore, as shown in FIG. 3B, the beam splitter 39 is formed to have a wedge shape whose thickness gradually changes along the longitudinal direction so that light reflected by the back face thereof has an angle relative to the optical axis.

The microscope 10 is provided with an external connection port 43 for connecting the microscope connecting unit 120. Between the image forming lens 27 and the second reflecting mirror 13B, a switching mirror 45 is retractably provided. When the switching mirror 45 is removed from the light path of the microscope 10, a primary image of the sample S is formed on the side of the eyepiece lens 31 (on the light path for visual observation in FIG. 3A). On the other hand, when the switching mirror 45 is placed in the light path of the microscope 10, a primary image of the sample S is formed on the side of the microscope connecting unit 120 (a primary-image point K in FIG. 3A) via the external connection port 43.

The laser unit 140 includes a laser oscillator, a wavelength selector, a laser intensity modulator, etc. (not shown). The laser unit 140 is configured to be capable of adjusting laser beams emitted by the laser oscillator to a wavelength and intensity suitable for observation by using the wavelength selector and the laser intensity modulator before outputting the laser beams.

Figure 4:
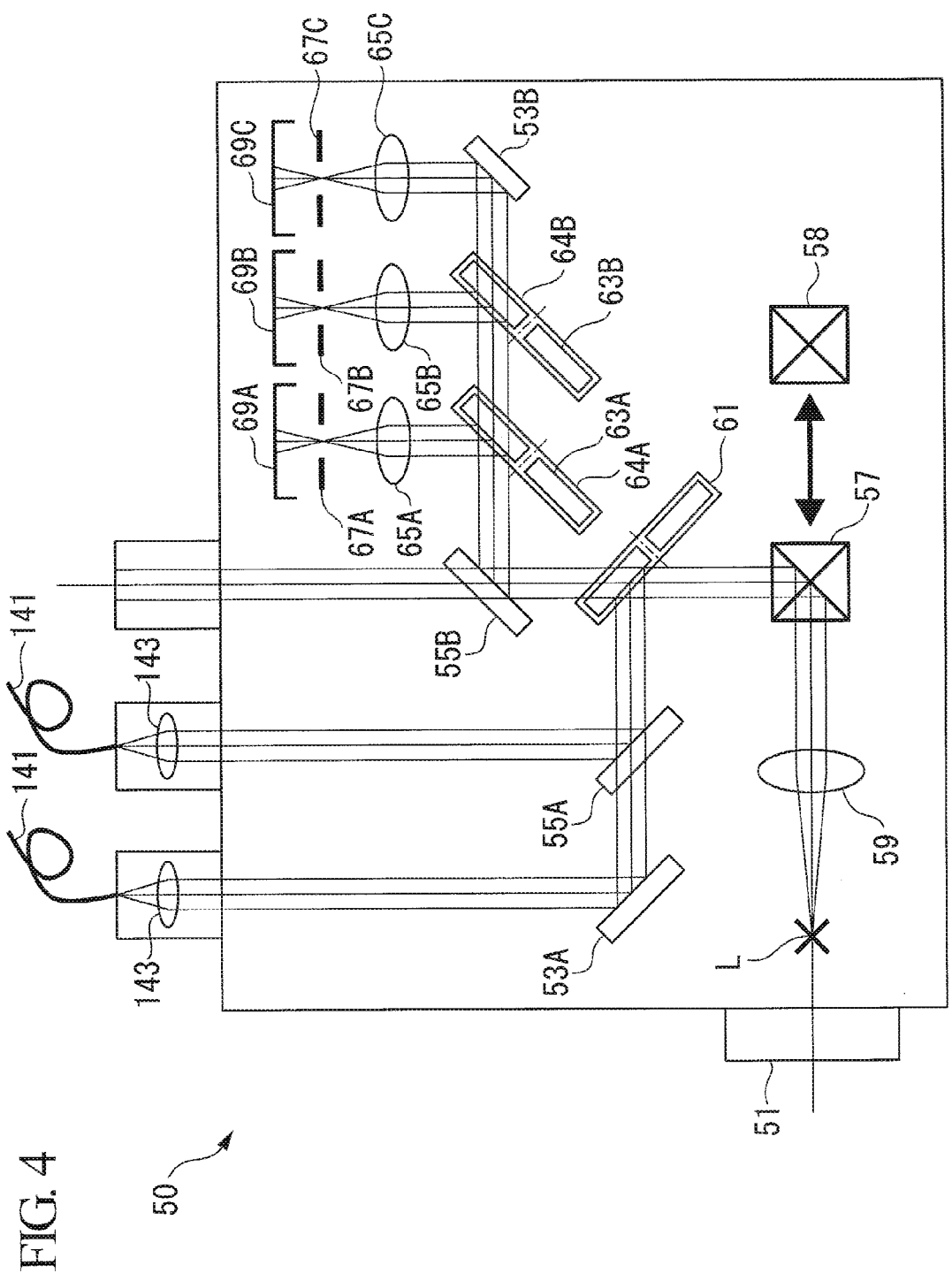
FIG. 4 is an illustration schematically showing the configuration of a confocal observation unit in FIG. 1.
Figure 5:
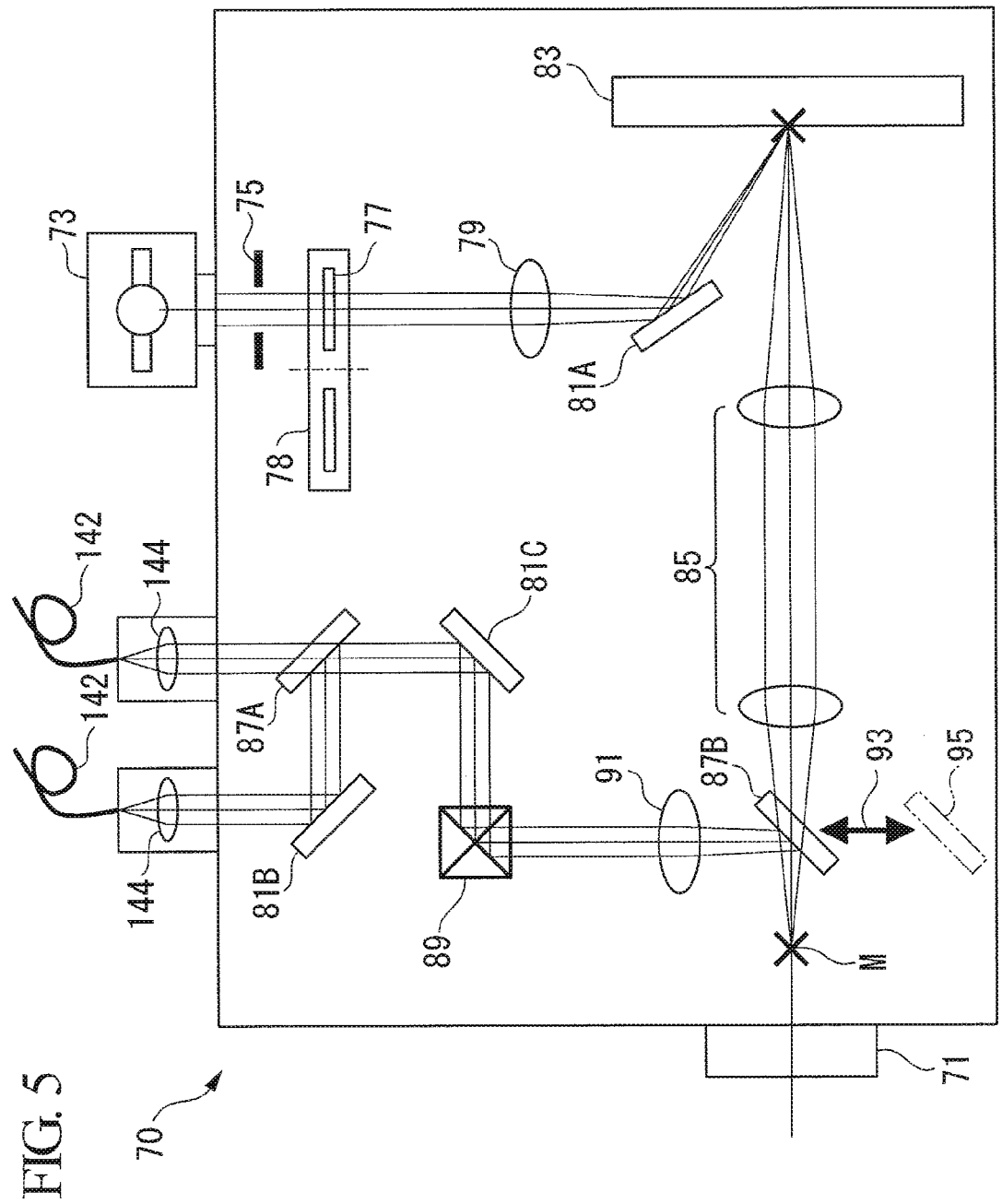
FIG. 5 is an illustration schematically showing the configuration of a stimulating unit in FIG. 1.

As shown in FIGS. 4 and 5, the laser unit 140 includes single-mode fibers 141 and 142 that guide laser beams to the confocal observation unit 50 and the stimulating unit 70 and collimator lenses 143 and 144 that are disposed facing the exit-end faces of the single-mode fibers 141 and 142 and that shape the guided laser beams into parallel light beams.

As shown in FIG. 4, the confocal observation unit 50 includes a connector (unit connector) 51 that is connected to the microscope connecting unit 120. Furthermore, the confocal observation unit 50 includes a first reflecting mirror 53A and a first beam splitter 55A that reflect laser beams guided from the laser unit 140, a galvanometric scanner (observation scanning unit) 57 that two-dimensionally scans the laser beams reflected by these devices over the sample S of the microscope 10 via the connector 51, and a pupil projection lens 59 that focuses the laser beams scanned by the galvanometric scanner 57 at a secondary-image point L of the sample S.

Furthermore, the confocal observation unit 50 includes an excitation dichroic mirror (DM) 61. The excitation DM 61 reflects the laser beams reflected by the first reflecting mirror 53A or the first beam splitter 55A to the galvanometric scanner 57 while transmitting fluorescence generated at the sample S irradiated with the laser beams and de-scanned by the galvanometric scanner 57. The galvanometric scanner 57 is switchable to a scanner 58 implemented by combining a galvanometric scanner and a resonant scanner.

Furthermore, the confocal observation unit 50 includes light-splitting dichroic mirrors (DMs) 63A and 63B and a second reflecting mirror 53B that reflect, on a per-wavelength basis, the fluorescence transmitted through the excitation DM 61 and reflected by a second beam splitter 55B, confocal pinholes 67A, 67B, and 67C that partially pass the fluorescence reflected by these devices and focused by confocal lenses 65A, 65B, and 65C, and photomultiplier tubes (PMTS) (detection optical system) 69A, 69B, and 69C that detect the fluorescence that has passed through the confocal pinholes 67A, 67B, and 67C.

The confocal observation unit 50 also functions as an illuminating unit that illuminates the sample S with light. Furthermore, the confocal observation unit 50 can also be used as an irradiating unit that stimulates the sample S with light.

The light-splitting DMs 63A and 63B are provided in filter turrets 64A and 64B, and are switchable in accordance with the wavelength characteristics of the relevant spectrum.

The PMTS 69A, 69B, and 69C are configured to output detection signals for individual pixels, obtained by detecting fluorescence, to the computer 154. Thus, the computer 154 constructs a two-dimensional image based on the input detection signals.

As shown in FIG. 5, the stimulating unit 70 includes a connector (unit connector) 71 that is connected to the microscope connecting unit 120. Furthermore, the stimulating unit 70 includes a mercury lamp (stimulation light source) 73 that emits light (stimulation light), a shutter 75 for passing or shutting off the light emitted from the mercury lamp 73, an excitation filter 77 that transmits light having passed through the shutter 75 and having a predetermined wavelength, a DMD (microdeflector array) 83 that deflects the light having passed through the excitation filter 77 and focused by a focusing lens 79 via a first reflecting mirror 81A, and a relay optical system that focuses the light deflected by the DMD 83 to a secondary-image point M of the sample S.

The mercury lamp 73 is provided removably on the frame of the stimulating unit 70.

The excitation filter 77 is provided in a filter turret 78, and it is switchable in accordance with wavelength characteristics.

The DMD 83 includes a plurality of pivotable micromirrors (not shown) that are arrayed two-dimensionally at a position conjugate with the position of an image formed via the image forming lens 27 and relayed by the relay optical system 85. The ON/OFF areas of the micromirrors can be arbitrarily chosen by an operation on the GUI and are controlled by the controller 152. Thus, it is possible to stimulate multiple points of the sample S simultaneously or to stimulate a specified area of the sample S.

Furthermore, the stimulating unit 70 includes a second reflecting mirror 81B, a first beam splitter 87A, and a third reflecting mirror 81C that reflect the laser beams guided from the laser unit 140, a galvanometric scanner (stimulation scanning unit) 89 that two-dimensionally scans the laser beams reflected by these devices over the sample S of the microscope 10 via the connector 71, and a pupil projection lens 91 that focuses the laser beams scanned by the galvanometric scanner 89 to the secondary-image point M of the sample S.

The laser beams scanned by the galvanometric scanner 89 can be combined by the second beam splitter 87B into the path of the light deflected by the DMD 83. The second beam splitter 87B has such characteristics that it transmits the light deflected by the DMD 83 while reflecting the laser beams scanned by the galvanometric scanner 89.

The second beam splitter 87B may be disposed in such a manner that it is switchable to a switching mirror 95 by a stimulating-unit switching unit 93 such as a filter turret. The switching mirror 95 is placed in the light path when the sample S is to be stimulated with the light emitted from the mercury lamp 73, and is removed from the light path when the sample S is to be stimulated with the laser beams guided from the laser unit 140.

The image capturing unit 110 includes a CCD (two-dimensional image capturing device) 111 that captures an image of the sample S formed at a secondary-image point N via the image forming lens 27. The two-dimensional image acquired by the CCD 111 is displayed on the monitor 156. Since the two-dimensional image capturing device detects light on a plane, the frame rate is higher compared with the case of confocal observation. Therefore, with the CCD 111, for example, it is possible to capture the quick response of a calcium ion or the like.

Furthermore, attachment mounts for CCD cameras are usually standardized, and the distance from the attachment surface to the photoreceptor surface (flange back) is predetermined. Therefore, the CCD 111 is connected to the microscope connecting unit 120 via a connector and a camera adapter (unit connector) 113 for adaptation to the CCD camera mount. The camera adapter 113 may function as a magnification adapter or a filter turret in addition to adapting to the mount and providing a certain distance.

As shown in FIG. 2, the microscope connecting unit 120 includes a microscope connection port (microscope connector) 121 that is connected to the external connection port 43 of the microscope 10, a first connection port 123A that is connected to the camera adapter 113 of the image capturing unit 110, a second connection port 123B that is connected to the connector 71 of the stimulating unit 70, and a third connection port 123C that is connected to the connector 51 of the confocal observation unit 50. Hereinafter, the first connection port 123A, the second connection port 123B, and the third connection port 123C will be referred to as unit connection ports 123A, 123B, and 123C. These unit connection ports 123A, 123B, and 123C all have the same shape.

Furthermore, the microscope connecting unit 120 includes a connecting-unit optical system (relay optical system) 125 that optically connects the microscope 10 to the image capturing unit 110, the stimulating unit 70, and the confocal observation unit 50 and light-path combining units 127A and 127B that combine light paths of the connecting-unit optical system 125.

The connecting-unit optical system 125 relays a primary image of the sample S formed via the image forming lens 27 to the confocal observation unit 50, the stimulating unit 70, and the image capturing unit 110. The connecting-unit optical system 125 is configured to form substantially parallel light beams.

Furthermore, the connecting-unit optical system 125 includes a first relay lens 129A that shapes light entering from the microscope 10 via the microscope connection port 121 into substantially parallel light beams, a second relay lens 129B that focuses, via the first connection port 123A, the light transmitted through the first relay lens 129A, a third relay lens 129C that focuses, via the second connection port 123B, the light transmitted through the first relay lens 129A, and a fourth relay lens 129D that focuses, via the third connection port 123C, the light transmitted through the first relay lens 129A.

Between the first relay lens 129A and the second relay lens 129B, a first light-path combining unit 127A that transmits light captured by the CCD 111 of the image capturing unit 110 while reflecting light at other wavelengths is provided. On the opposite side of the first light-path combining unit 127A, a second light-path combining unit 127B that reflects light coming from the first light-path combining unit 127A to the third relay lens 129C while transmitting light at other wavelengths is provided. On the transmitting side of the second light-path combining unit 127B, a reflecting mirror 131 that reflects light transmitted through the second light-path combining unit 127B to the fourth relay lens 129D is provided.

Since these light-path combining units 127A and 127B are disposed in the path of substantially parallel light beams, image degradation due to astigmatic difference can be prevented. Astigmatic difference refers to the difference between the points at which light is focused with respect to two directions perpendicular to the optical axis.

Alternatively, by arranging the connecting-unit optical system 125 to form non-parallel light beams, it is possible to prevent light from being reflected by the back faces of the first and second light-path combining units 127A and 127B, thereby preventing image degradation caused by interference fringes.

In the thus-configured connecting-unit optical system 125, the first relay lens 129A and the second relay lens 129B relay a primary image of the sample S to the secondary-image point N in the image capturing unit 110. Furthermore, the first relay lens 129A and the third relay lens 129C relay the primary image of the sample S to the secondary-image point M in the stimulating unit 70. Furthermore, the first relay lens 129A and the fourth relay lens 129D relay the primary image of the sample S to the secondary-image point L in the confocal observation unit 50.

The secondary images of the sample S relayed by the connecting-unit optical system 125 are formed at points equidistant from the individual unit connection ports 123A, 123B, and 123C. That is, the distance from the first connection port 123A to the secondary-image point N, the distance from the second connection port 123B to the secondary-image point M, and the distance from the third connection port 123C to the secondary-image point L are all the same.

The first and second light-path combining units 127A and 127B are provided in disk-shaped filter turrets (switching units) 128A and 128B that can be rotated by motors (not shown), and are switchable in accordance with wavelength characteristics by the operation of the controller 152.

Furthermore, the first and second light-path combining units 127A and 127B are formed of a plurality of beam splitters, mirrors, and pieces of glass (not shown), and the beam splitters are provided removably in the filter turrets 128A and 128B. It is possible to select suitable beam splitters in accordance with the observation method by operating the GUI (not shown).

The operation of the thus-configured microscope connecting unit 120 and microscope system 100 according to this embodiment will be described below.

When the microscope system 100 according to this embodiment is used to observe the sample S with the confocal observation unit 50 while stimulating the sample S with the stimulating unit 70 and to capture, with the image capturing unit 110, an image representing the response of the sample S to the stimulation, the controller 152 places suitable light-path combining units 127A and 127B in the microscope connecting unit 120 in accordance with the observation method.

As the first light-path combining unit 127A, one with such wavelength characteristics that laser beams from the confocal observation unit 50, light from the stimulating unit 70, and fluorescence detected by the confocal observation unit 50 are reflected whereas fluorescence captured by the CCD 111 is transmitted is selected.

As the second light-path combining unit 127B, one with such wavelength characteristics that laser beams from the confocal observation unit 50 and fluorescence generated at the sample S through excitation with the laser beams are transmitted whereas light from the stimulating unit 70 is reflected is selected.

In the confocal observation unit 50, laser beams guided from the laser unit 140 are reflected by the excitation DM 61 via the first reflecting mirror 53A or the first beam splitter 55A to the galvanometric scanner 57. Then, the laser beams are scanned by the galvanometric scanner 57, are focused by the pupil projection lens 59, and pass through the third connection port 123C to enter the microscope connecting unit 120.

The laser beams having entered the microscope connecting unit 120 are transmitted through the fourth relay lens 129D and become substantially parallel light beams, which are reflected by the reflecting mirror 131. The laser beams reflected by the reflecting mirror 131 are transmitted through the second light-path combining unit 127B and are reflected by the first light-path combining unit 127A, and are then focused by the first relay lens 129A and pass through the microscope connection port 121 to enter the microscope 10.

The laser beams having entered the microscope 10 are transmitted through the beam splitter 39 in the cube turret 41 via the switching mirror 45 and the image forming lens 27 and irradiate the sample S via the objective lens 23. When fluorescence occurs at the sample S irradiated with the laser beams, the fluorescence is focused by the objective lens 23, is transmitted through the image forming lens 27, is reflected by the switching mirror 45, and passes through the microscope connection port 121 to enter the microscope connecting unit 120.

The fluorescence having entered the microscope connecting unit 120 is transmitted through the first relay lens 129A and is reflected by the first light-path combining unit 127A. Then, the fluorescence is transmitted through the second light-path combining unit 127B and is then reflected by the reflecting mirror 131. Then, the fluorescence is focused by the fourth relay lens 129D and passes through the third connection port 123C to enter the confocal observation unit 50.

The fluorescence having entered the confocal observation unit 50 is de-scanned by the galvanometric scanner 57 and is transmitted through the excitation DM 61. Then, the fluorescence is spectrally split by the light-splitting DMs 63A and 63B via the second beam splitter 55B in accordance with the wavelength characteristics. The split fluorescence is focused by the confocal lenses 65A, 65B, and 65C and passes through the confocal pinholes 67A, 67B, and 67C to enter the PMTs 69A, 69B, and 69C.

The PMTs 69A, 69B, and 69C detect the fluorescence and output detection signals obtained for individual pixels to the computer 154. Then, the computer 154 constructs a two-dimensional image of the sample S based on the input detection signals, and the image is displayed on the monitor 156.

Next, in the stimulating unit 70, light emitted from the mercury lamp 73 enters the DMD 83 via the shutter 75, the excitation filter 77, the focusing lens 79, and the first reflecting mirror 81A. The light having entered the DMD 83 is reflected by micromirrors in the ON area, is transmitted through the relay optical system 85 and the second beam splitter 87B, and passes through the second connection port 123B to enter the microscope connecting unit 120.

On the other hand, when the sample S is to be stimulated with laser beams, laser beams guided from the laser unit 140 are reflected by the third reflecting mirror 81C to the galvanometric scanner 89 via the second reflecting mirror 81B or the first beam splitter 87A. Then, the laser beams are scanned by the galvanometric scanner 89 and are reflected by the second beam splitter 87B via the pupil projection lens 91. Then, the laser beams pass through the second connection port 123B to enter the microscope connecting unit 120.

The light having entered the microscope connecting unit 120 is transmitted through the third relay lens 129C and becomes substantially parallel light beams, and the light beams are reflected by the second light-path combining unit 127B and the first light-path combining unit 127A. The light reflected by the first light-path combining unit 127A is focused by the first relay lens 129A and passes through the microscope connection port 121 to enter the microscope 10. The light having entered the microscope 10 irradiates the sample S via the switching mirror 45, the image forming lens 27, and the objective lens 23, whereby the sample S is stimulated.

Next, in the image capturing unit 110, excitation light emitted from the mercury lamp 37 is reflected by the beam splitter 39 in the cube turret 41, and the reflected light irradiates the sample S via the objective lens 23. When fluorescence occurs at the sample S irradiated with the excitation light, the fluorescence is transmitted through the beam splitter 39 and the image forming lens 27 and is reflected by the switching mirror 45, and then passes through the microscope connection port 121 to enter the microscope connecting unit 120.

The fluorescence having entered the microscope connecting unit 120 is transmitted through the first relay lens 129A, the first light-path combining unit 127A, and the second relay lens 129B, and then passes through the first connection port 123A to enter the image capturing unit 110. The fluorescence having entered the image capturing unit 110 is captured by the CCD 111 via the camera adapter 113. The two-dimensional image of the sample S acquired by the CCD 111 is displayed on the monitor 156.

In this manner, it is possible to stimulate the sample S at a desired position with the stimulating unit 70 while observing an image of the sample S acquired by the confocal observation unit 50 and displayed on the monitor 156. Furthermore, with the image capturing unit 110, it is possible to capture an image representing the response of the sample S stimulated with the stimulating unit 70 and to quickly acquire a two-dimensional image. Alternatively, the sample S may be stimulated at a desired position with the stimulating unit 70 while observing a two-dimensional image of the sample S acquired by the image capturing unit 110, and the response of the sample S to the stimulation may be observed with the confocal observation unit 50, acquiring a more detailed image.

As described above, with the microscope connecting unit 120 and the microscope system 100 according to this embodiment, via the microscope connection port 121 and the unit connection ports 123A, 123B, and 123C, it is possible to optically connect the confocal observation unit 50, the stimulating unit 70, and the image capturing unit 110 to the microscope 10 without increasing the size of the microscope 10 or degrading the working efficiency of the microscope 10.

Furthermore, by combining the light paths of the connecting-unit optical system 125 with the light-path combining units 127A and 127B, it is possible to use the confocal observation unit 50, the stimulating unit 70, and the image capturing unit 110 simultaneously without switching the light paths. Accordingly, it becomes possible to observe the sample S without missing quick responses.

Furthermore, by relaying the primary image of the sample S with the connecting-unit optical system 125 and reconstructing the image at points remote from the microscope 10, it is possible to readily dispose the light-path combining units 127A and 127B between the microscope connection port 121 and the unit connection ports 123A, 123B, and 123C. Accordingly, it becomes easier to combine a plurality of light paths.

Furthermore, since the unit connection ports 123A, 123B, and 123C all have the same shape, and because the distances from the unit connection ports 123A, 123B, and 123C to secondary images of the sample S are all the same, it is possible to connect the confocal observation unit 50, the stimulating unit 70, and the image capturing unit 110 to the unit connection ports 123A, 123B, and 123C in free combinations. Accordingly, the ability to change the observation method can be increased.

Figure 6:
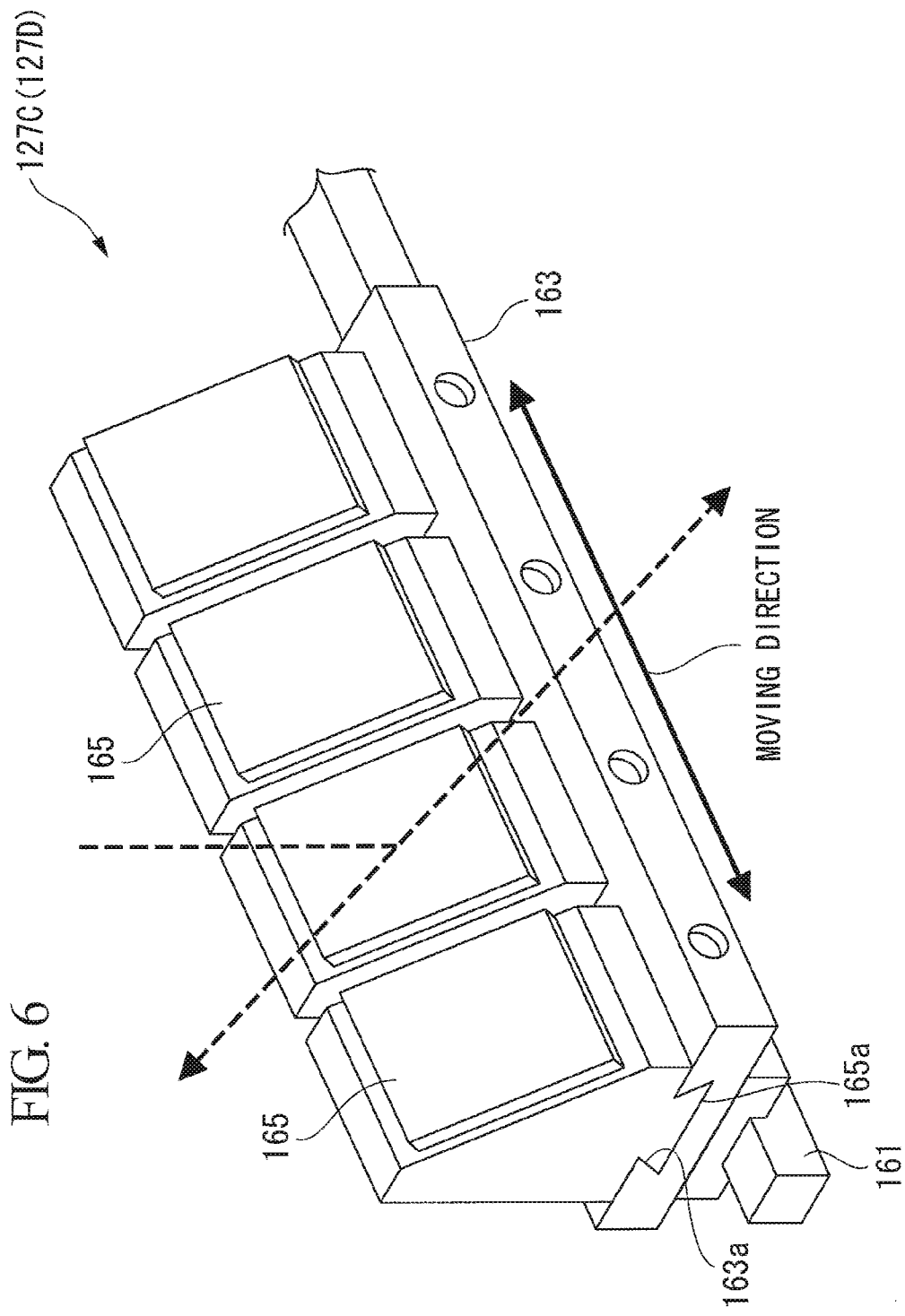
FIG. 6 is an illustration schematically showing the configuration of a light-path combining unit according to a modification of the first embodiment of the present invention.
Figure 7A:
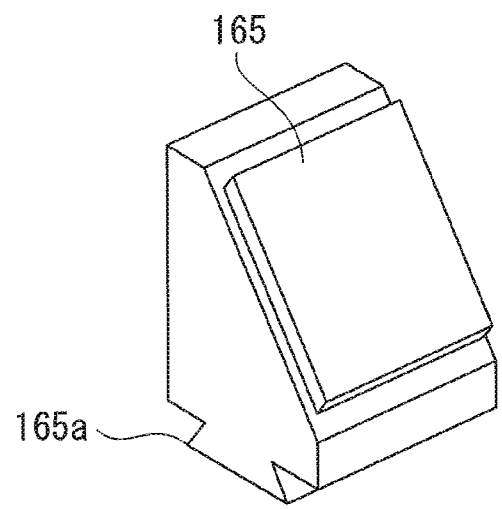
FIG. 7A is an illustration schematically showing the configuration of a beam splitter in FIG. 6.
Figure 7B:
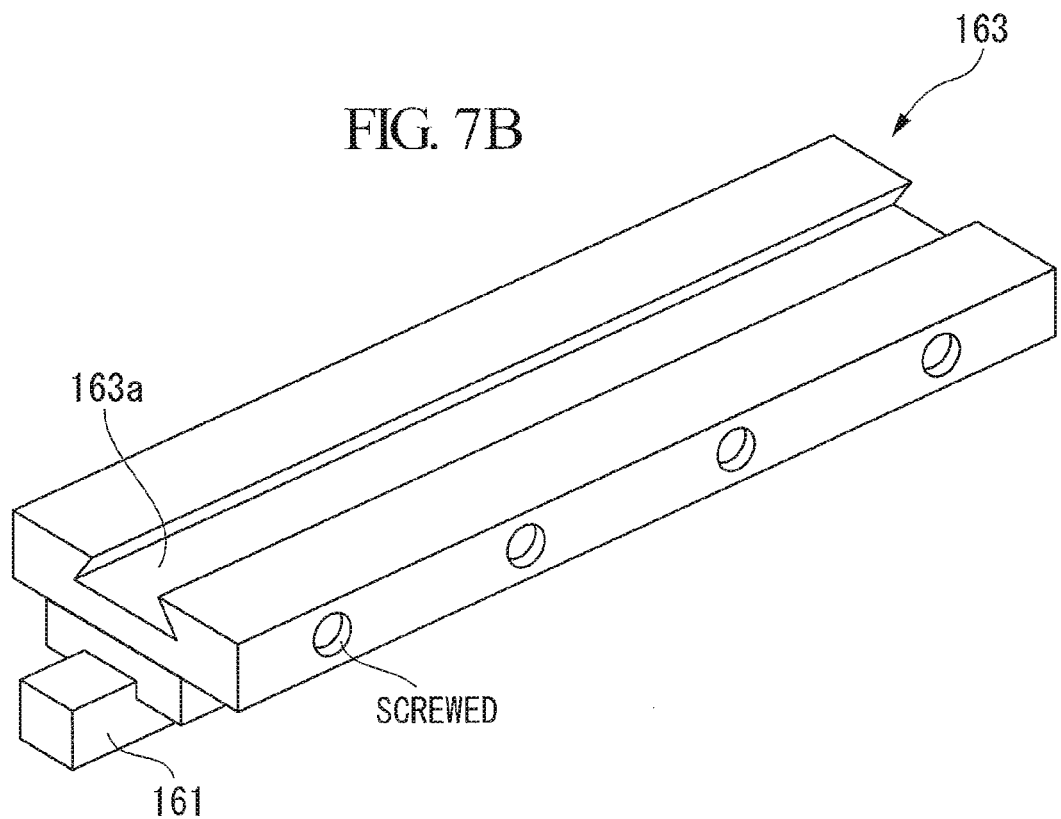
FIG. 7B is an illustration schematically showing the configuration of a slide switching unit.

Although the embodiment has been described in the context of an example where the disk-shaped filter turrets 128A and 128B are used as switching units of the light-path combining units 127A and 127B, alternatively, for example, a slide switching unit 163 implemented by a linear guide 161 may be employed, as shown in FIGS. 6, 7A, and 7B. In this case, light-path combining units 127C and 127D can be implemented by a plurality of cube-based beam splitters 165 each having a dovetail 165a that is engaged with a dovetail groove 163a of the slide switching unit 163. A suitable beam splitter 165 can be selectively disposed in the light paths by sliding the slide switching unit 163 in a direction perpendicular to the optical axis. The cube-based beam splitters 165 can be removably attached to the slide switching unit 163 via screws.

Second Embodiment

Next, the microscope connecting unit 120 and a microscope system 200 according to a second embodiment of the present invention will be described.

Figure 8:
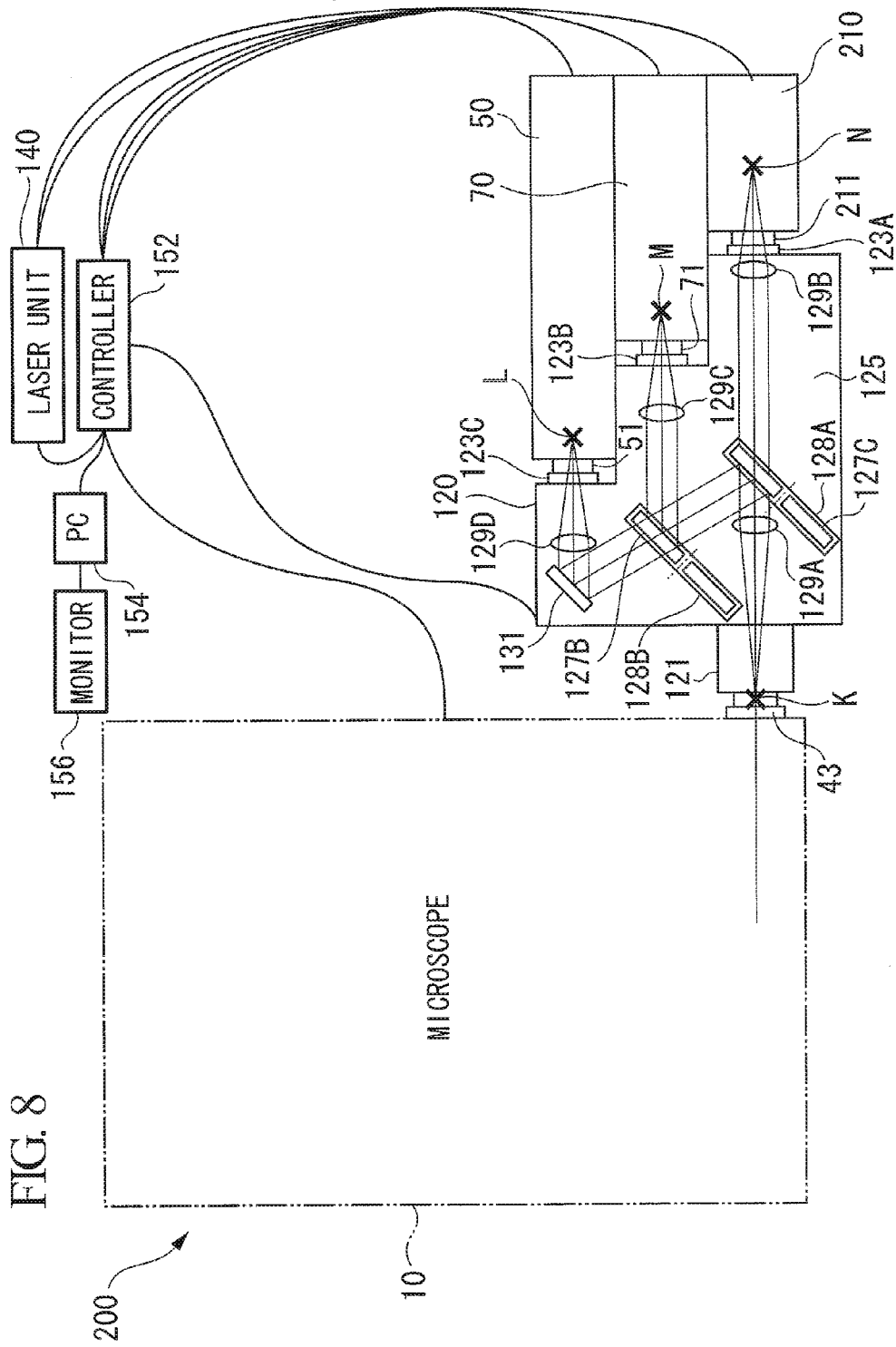
FIG. 8 is an illustration schematically showing the configuration of a microscope system according to a second embodiment of the present invention.

As shown in FIG. 8, the microscope system 200 differs from the first embodiment in that it includes an observation high-speed laser scanning unit (DMD multipoint laser scanning unit, hereinafter simply referred to as a "multipoint scanning unit") 210 that functions as both an illuminating unit and a detecting unit, instead of the image capturing unit 110.

In the following description, parts that are configured the same as those in the microscope system 100 according to the first embodiment are designated by the same reference signs, and a description thereof will be omitted.

Figure 9:
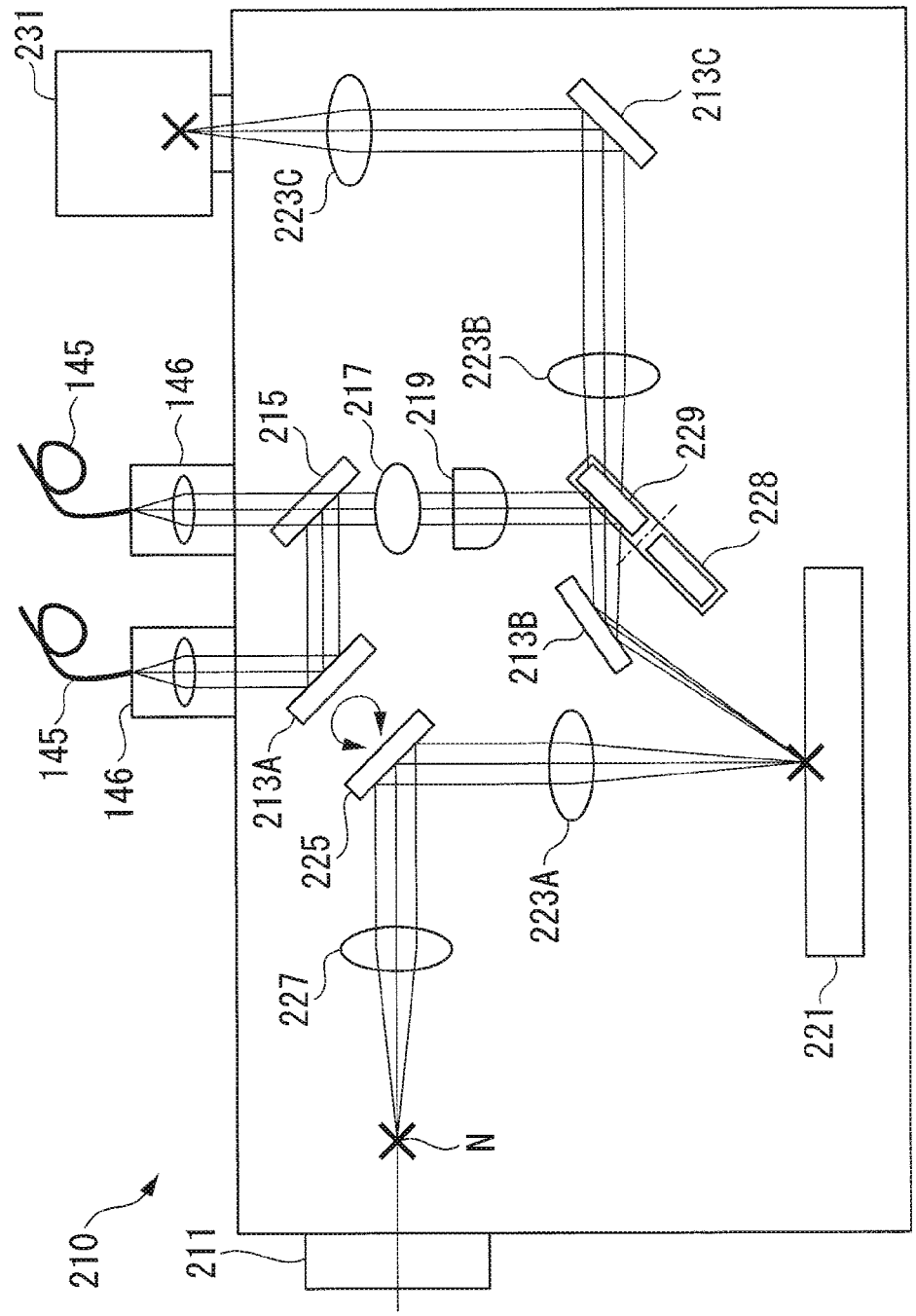
FIG. 9 is an illustration schematically showing the configuration of a multipoint scanning unit in FIG. 8.

As shown in FIG. 9, the multipoint scanning unit 210 includes a connector (unit connector) 211 that is connected to the first connection port 123A of the microscope connecting unit 120. Furthermore, the multipoint scanning unit 210 includes a first reflecting mirror 213A and a beam splitter 215 that reflect laser beams (illuminating light) guided by a single-mode fiber 145 and a collimator lens 146 of the laser unit 140 (illuminating unit), a collimator lens 217 and a cylindrical lens 219 that converge the laser beams reflected by these devices into a line form via a second reflecting mirror 213B, and a DMD 221 that deflects the converged laser beam.

The DMD 221 includes a plurality of pivotable micromirrors (not shown) that are arrayed at a position optically conjugate with the sample-side focal point of the objective lens 23.

The collimator lens 217 and the cylindrical lens 219 are configured to converge laser beams into a line form in a direction parallel to the switching direction of the micromirrors of the DMD 221.

Furthermore, the multipoint scanning unit 210 includes a galvanometric scanner (multipoint scanning unit) 225 that one-dimensionally scans the laser beams deflected by the DMD 221 and transmitted through a first focusing lens 223A and a pupil projection lens that focuses the scanned laser beams to the secondary-image point N of the sample S.

Furthermore, the multipoint scanning unit 210 includes an excitation DM 229 that reflects the laser beams converged by the cylindrical lens 219 to the DMD 221 while transmitting fluorescence generated at the sample S irradiated with laser beams and de-scanned by the DMD 221.

The excitation DM 229 is provided in a filter turret 228, and can be switched to have different wavelength characteristics in accordance with the observation method.

Furthermore, the multipoint scanning unit 210 includes a photodetector (detecting unit) 231 that detects fluorescence transmitted through the excitation DM 229 and focused via a second focusing lens 223B, a third reflecting mirror 213C, and a third focusing lens 223C. As the photodetector 231, for example, a one-dimensional image capturing element, such as a line sensor, or a two-dimensional image capturing element, such as a CCD, is used.

The multipoint scanning unit 210 can also be used as an irradiating unit for stimulating the sample S with light.

The operation of the thus-configured microscope system 200 according to this embodiment will be described below.

With the microscope system 200 according to this embodiment, when a fluorescence image of the sample S is acquired by using the multipoint scanning unit 210, the controller 152 places a suitable first light-path combining unit 127C and a suitable second light-path combining unit 127B in the microscope connecting unit 120 in accordance with the observation method.

As the first light-path combining unit 127C, one with such wavelength characteristics that laser beams from the confocal observation unit 50, light from the stimulating unit 70, and fluorescence detected by the confocal observation unit 50 are reflected whereas light from the multipoint scanning unit 210 and fluorescence generated at the sample S through excitation with the light are transmitted is selected.

The second light-path combining unit 127B is the same as that in the case of the image capturing unit 110.

In the multipoint scanning unit 210, laser beams guided from the laser unit 140 and reflected by the first reflecting mirror 213A or the beam splitter 215 are converged by the collimator lens 217 and the cylindrical lens 219 into a line form in a direction parallel to the switching direction of the micromirrors. Then, the converged laser beam is reflected to the DMD 221 by the excitation DM 229 and the second reflecting mirror 213B.

The DMD 221 turns on one or more neighboring micromirrors in an area so that laser beams are reflected by this ON area. The laser beams reflected by the micromirrors enter the galvanometric scanner 225 via the first focusing lens 223A. In this case, by switching the DMD 221 so that the ON area moves in one direction, the laser beams enter the galvanometric scanner 225 while moving in the ON-area switching direction.

Then, by pivoting the galvanometric scanner 225, the laser beams are scanned in one direction parallel to the ON-area switching direction of the DMD 221. The laser beams are focused by the pupil projection lens 227 and pass through the first connection port 123A to enter the microscope connecting unit 120.

The laser beams having entered the microscope connecting unit 120 are transmitted through the second relay lens 129B and become substantially parallel light beams. Then, the light beams are transmitted through the second light-path combining unit 128A, are focused by the first relay lens 129A, and pass through the microscope connection port 121 to enter the microscope 10.

Here, by synchronizing the ON-area switching operation of the DMD 221 and the pivoting operation of the galvanometric scanner 225, the laser beams having entered the microscope 10 are focused by the objective lens 23 and are two-dimensionally scanned over the sample S.

Fluorescence generated at the sample S through irradiation with the laser beams is focused by the objective lens 23 and then passes through the microscope connection port 121 via the image forming lens 27 and the switching mirror 45. Then, the fluorescence is transmitted through the first relay lens 129A and the second relay lens 129B in the microscope connecting unit 120 and passes through the first connection port 123A to enter the multipoint scanning unit 210.

The fluorescence having entered the multipoint scanning unit 210 is de-scanned by the DMD 221 via the pupil projection lens 227, the galvanometric scanner 225, and the first focusing lens 223A.

The fluorescence de-scanned by the DMD 221 is transmitted through the excitation DM 229 via the second reflecting mirror 213B and is separated from the laser beams. Then, the fluorescence is focused via the second focusing lens 223B, the third reflecting mirror 213C, and the third focusing lens 223C, and then enters the photodetector 231.

Here, since the DMD 221 is disposed at a position optically conjugate with the sample-side focal point of the objective lens 23, the fluorescence is reflected by the same micromirrors that reflected the laser beams, and the reflected fluorescence enters the photodetector 231.

In this case, by setting the ON-area of the DMD 221 sufficiently small, it is possible to use the ON area as a confocal pinhole. Thus, the photodetector 231 acquires a sharp fluorescence image of the sample S on the sample-side focal plane of the objective lens 23, i.e., a line-scan image generated by moving the ON area of the DMD 221 in one direction.

The line-scan image acquired by the photodetector 231 on a per-pivot-position basis of the galvanometric scanner 225 is stored in the computer 154 in association with the corresponding pivot point of the galvanometric scanner. Then, a two-dimensional fluorescence image is constructed based on the line-scan image stored in the computer 154.

As described hereinabove, with the microscope connecting unit 120 and the microscope system 200 according to this embodiment, by using the multipoint scanning unit 210 as the irradiating unit and the detecting unit, the frame rate becomes higher compared with the case where a galvanometric scanner, a resonant scanner, or the like is used. Accordingly, it is possible to observe the sample S without missing its quick response.

Although the embodiments of the present invention have been described above in detail with reference to the drawings, specific configurations are not limited to the embodiments, and design modifications or the like not departing from the spirit of the present invention are encompassed.

For example, in the above-described embodiments, the computer 154 may function as storage means that stores reference information regarding points of irradiation of the sample S by irradiating unit, such as the stimulating unit 70, and points of light detection by detecting units such as the confocal observation unit 50, the image capturing unit 110, and the multipoint scanning unit 210. Furthermore, the controller 152 may function as a correcting unit that corrects displacement of points of irradiation of the sample S by the irradiating units or displacement of points of light detection by the detecting units, caused by switching of the light-path combining units 127A, 127B, and 127C.

Accordingly, even when the light-path combining units 127A, 127B, and 127C are switched in accordance with the observation method, occurrence of image displacement among images acquired by the confocal observation unit 50, the image capturing unit 110, or the multipoint scanning unit 210 can be prevented, and displacement of points of stimulation by the stimulating unit 70 can also be prevented.

Furthermore, although the confocal observation unit 50, the stimulating unit 70, the image capturing unit 110, or the multipoint scanning unit 210 is connected to the microscope connecting unit 120 in the above-described embodiments, alternatively, the microscope connecting unit 120 may have three or more unit connection ports, and three or more irradiating units or detecting units may be connected to the microscope 10.

What is claimed is:

1. A microscope connecting unit comprising:
    a microscope connector that is connectable to a microscope used to observe a sample;
    three or more connection ports to which an irradiating unit that irradiates the sample with light or a detecting unit that detects light generated at the sample is connectable;
    two or more light-path combining units that are disposed between the microscope connector and the connection ports and that combine light paths optically connecting the microscope with the irradiating unit or the detecting unit; and
    a relay optical system that is configured to form the light paths and relay a primary image of the sample formed by the microscope to the connection ports to form respective secondary images, wherein the relay optical system comprises:
        a first lens which is provided between the microscope connector and the light path combining units, and which is configured to shape light entering from the microscope into substantially parallel light beams; and
        a plurality of second lenses each of which is provided between said each of the connection ports and the light path combining units, and which is configured to focus the substantially parallel light beams transmitted through the first lens to said each of the connection ports.

2. The microscope connecting unit according to claim 1, wherein the connection ports have substantially a same shape.

3. The microscope connecting unit according to claim 1, further comprising a switching unit that can switch the light-path combining units on the light paths.

4. The microscope connecting unit according to claim 3, wherein at least one of the light-path combining units is mountable on and removable from the switching unit.

5. The microscope connecting unit according to claim 3, wherein the light-path combining units are each implemented by a plurality of beam splitters; and wherein the plurality of beam splitters are mountable on and removable from the switching unit.

6. A microscope system comprising:
the microscope connecting unit according to claim 3, the microscope,
the irradiating unit or the detecting unit, and
a control device that controls the microscope system.

7. The microscope system according to claim 6, further comprising:
a storage unit that stores reference information regarding points of irradiation of the sample by the irradiating unit and points of light detection by the detecting unit; and
a correcting unit that corrects displacement of the points of irradiation by the irradiating unit and displacement of the points of detection by the detecting unit, based on the reference information stored in the storage unit.

8. The microscope system according to claim 6, wherein the detecting unit includes:
a unit connector that is connected to one of the connection ports;
an observation light source that generates observation excitation light for irradiating the sample;
an observation scanning unit that two-dimensionally scans the observation excitation light emitted from the observation light source over the sample;
a confocal pinhole that partially passes observation light emitted from the sample irradiated with the observation excitation light and returning via the observation scanning unit; and
a detection optical system that detects the observation light having passed through the confocal pinhole.

9. The microscope system according to claim 6, wherein the irradiating unit includes:
a unit connector that is connected to one of the connection ports;
a stimulation light source that generates stimulation light for irradiating the sample; and
a stimulation scanning unit that two-dimensionally scans the stimulation light emitted from the stimulation light source over the sample.

10. The microscope system according to claim 6, wherein the detecting unit includes a two-dimensional image capturing device that is connectable to and disconnectable from any of the connection ports.

11. The microscope system according to claim 6, wherein the detecting unit includes a multipoint scanning unit that scans the light concurrently at multiple points and an irradiating unit that irradiates the sample with illuminating light.

12. A microscope system comprising:
a microscope configured to visually observe a sample;
the microscope connecting unit according to claim 1;
a laser unit configured to generate laser beams; and
a confocal observation unit configured to scan the laser beams from the laser unit two-dimensionally over the sample to perform confocal observation of the sample,
wherein the confocal observation unit, which comprises a scanner that two-dimensionally scans the laser beams, is connected to at least one of the connection ports, and
wherein the scanner is configured to two-dimensionally scan the laser beams over the sample in the microscope via the microscope connecting unit.

13. A microscope connecting unit comprising:
a microscope connector that is connectable to a microscope used to observe a sample;
three or more connection ports to which an irradiating unit that irradiates the sample with light or a detecting unit that detects light generated at the sample is connectable;
two or more light-path combining units that are disposed between the microscope connector and the connection ports and that combine light paths optically connecting the microscope with the irradiating unit or the detecting unit; and
a relay optical system that is configured to form the light paths and relay a primary image of the sample formed by the microscope to the connection ports to form respective secondary images, wherein the relay optical system forms non-parallel light beams, and wherein the relay optical system comprises:
a first lens which is provided between the microscope connector and the light path combining units; and
a plurality of second lenses each of which is provided between said each of the connection ports and the light path combining units, and which is configured to focus light transmitted through the first lens to said each of the connection ports.

* * * * *